United States Patent [19]

Alexander

[11] Patent Number: 4,869,140
[45] Date of Patent: Sep. 26, 1989

[54] ADJUSTABLE PRECISION LIVE CENTER FOR USE WITH A LATHE

[76] Inventor: Billy R. Alexander, Rte. 5, Box 527, Benbrook, Tex. 76126

[21] Appl. No.: 226,090

[22] Filed: Jul. 28, 1988

[51] Int. Cl.$^4$ .............................................. B23B 23/04
[52] U.S. Cl. ........................................ 82/150; 82/148; 82/15
[58] Field of Search ................. 82/15, 31, 33 R, 33 A

[56] References Cited

U.S. PATENT DOCUMENTS

| | | | |
|---|---|---|---|
| 1,319,585 | 10/1919 | Hunt | 82/15 |
| 1,358,164 | 11/1920 | Kottinger | 82/15 |
| 1,993,809 | 3/1935 | Schnelle | 82/33 R |
| 2,131,327 | 9/1938 | Lippard | 82/33 A |
| 2,142,639 | 1/1939 | Fish | 82/33 R |
| 2,372,916 | 4/1945 | Truba et al. | 82/15 |
| 2,378,811 | 6/1945 | Vinner | 82/33 R |
| 2,706,872 | 4/1955 | Flanders et al. | 51/95 |
| 2,944,454 | 7/1960 | Vasselli | 82/15 |
| 3,057,238 | 10/1962 | Benes | 82/33 R |
| 3,593,602 | 7/1971 | Westrom | 82/15 |
| 3,630,112 | 12/1971 | Sudholt | 82/33 R |
| 3,653,287 | 4/1972 | Zeeb | 82/33 A |

FOREIGN PATENT DOCUMENTS

| | | | |
|---|---|---|---|
| 2305486 | 8/1974 | Fed. Rep. of Germany | 82/33 A |
| 1113531 | 5/1968 | United Kingdom | 82/33 A |

*Primary Examiner*—Frederick R. Schmidt
*Assistant Examiner*—William E. Terrell
*Attorney, Agent, or Firm*—Melvin A. Hunn; James E. Bradley

[57] ABSTRACT

An adjustable precision live center is provided for use with lathes having a spindle housing slidably interlocking with a shank block by operation of a dovetail tenon mated to a dovetail mortise of said shank block. A spindle is rotatably coupled to the spindle housing, extending rearward through the dovetail tenon of the spindle housing. Precision adjustment of the spindle housing relative to the shank bock is made possible by an adjustment bolt.

14 Claims, 2 Drawing Sheets

ADJUSTABLE PRECISION LIVE CENTER FOR USE WITH A LATHE

BACKGROUND OF THE INVENTION

1. Field of the Invention:

This invention relates generally to attachments for use with metalworking lathes, and more particularly to an adjustable precision live center for use with metal working lathes.

2. Background Art:

Lathes are widely used to cut and remove tapers from shafts, tubes, and pipes, hereinafter collectively referred to as "workpieces". In a typical lathe, a workpiece is coupled between the chuck and the tailstock of the lathe. As the lathe rotates the workpiece, a tool post is advanced towards the chuck, removing material from the workpiece. If, however, the chuck and the tailstock are not perfectly aligned, the tool post will cut a taper in the circumference of the workpiece.

More specifically, if the tailstock of the lathe is positioned closer to the tool post than the chuck of the lathe, then the end of the workpiece that is coupled to the tailstock will be cut to a smaller diameter than the end of the workpiece coupled to the chuck end of the lathe. Conversely, if the tailstock is positioned farther from the tool post than the chuck end of the lathe, the end of the workpiece coupled to the tailstock will be cut to a diameter larger than the end of the workpiece coupled to the chuck of the lathe. Thus, in one instance the diameter of the workpiece gradually increases along the length of the workpiece from tailstock to chuck, and in the other instance the diameter of the workpiece decreases along the length of the workpiece from tailstock to chuck. Often, the object of lathe work upon shafts, tubes, and pipes is to remove all tapers to provide a perfectly uniform shaft, tube, or pipe, so a tapered workpiece is unacceptable.

Of course, such defects may be corrected through adjustment of the lathe tailstock relative to the lathe chuck. To remove an unwanted taper, the tailstock must be physically adjusted before another pass can be made with the tool post. Often, actuation of the means for adjusting the position of the tailstock relative to the chuck will introduce as much, if not greater, error than that sought to be corrected by the adjustment. More specifically, the various levers, adjustment wheels, and threaded screws do not allow for precision adjustment, and often introduce additional unwanted taper into the workpiece. Thus, the manufacture of a workpiece often requires several passes of the lathe, many of which are required due to the crudeness of the adjustment features present in most lathes. This process is time consuming, often requiring half an hour to forty-five minutes of lathe work to fully remove the taper from a workpiece. This process can only be characterized as an inefficient and sloppy convergence.

Moreover, the repeated adjustment of the tailstock may result in damage to the adjustment means. For example, adjustment screws may become stripped through repeated use. When such damage occurs, the lathe is completely useless, and a time-consuming and expensive repair job must be undertaken to restore the lathe to operation.

A variety of prior art live and dead center lathe tools exist for coupling between the tailstock of the lathe and the workpiece which allow for the lateral adjustment of the workpiece relative to the lathe. However, these prior art lather tools generally are unsuitable for high speed precision work, and often lack sufficient stability.

U.S. Pat. No. 1,319,585 for Lathe Tool granted Oct. 21, 1919 to L. E. Hunt discloses a "dead center" lathe tool that allows for the lateral adjustment of the tailstock assembly. Since it is a "dead center" having no bearings it is not rotatable at high speeds. Moreover, the lateral adjustment mechanism is spring-biased, so this device is not a precision instrument.

U.S. Pat. No. 1,358,164 for Lathe Center granted Nov. 9, 1920 to V. A. Cottinger discloses a lathe center that allows for the lateral adjustment of the workpiece without adjustment of the tailstock. The overall length of this lathe center renders it unstable, and thus unsuitable for precision work.

U.S. Pat. No. 3,593,602 for Taper Attachment for A Turning Lathe granted July 20, 1971, to S. J. Westrom discloses a taper attachment that allows for the lateral adjustment of the lathe center relative to the tailstock through operation of a sliding plate assembly, which renders the apparatus unsuitable for high speed precision work.

U.S. Pat. No. 3,630,112 for Machine Tool Center granted Dec. 28, 1971 to K. J. Sudholt discloses a machine tool center that allows for the lateral adjustment of the lathe center relative to the tailstock by operation of a worm gear arrangement, which renders the apparatus unsuitable for precision work.

SUMMARY OF THE INVENTION

It is therefore one object of the present invention to provide an adjustable precision live center for use with lathes.

It is another object of the present invention to provide a compact, highly stable adjustable precision live center for high speed operation on lathes.

It is yet another object of the present invention to provide an adjustable precision live center having as long a spindle as possible for enhanced rotation stability while simultaneously being as overall compact as possible for providing the desired rigidity for precision work.

It is yet another object of the present invention to provide a live center that is adjustable in precision increments, greatly reducing the time required to cut and remove tapers from workpieces.

The live center of the present invention consists of a plurality of interlocking pieces including a spindle housing with forward and rearward ends, having a lock piece disposed at the rearward end, and an axial central cavity formed therethrough extending from the forward end to the rearward end and terminating in the lock piece. A spindle for coupling to the workpiece is carried by the spindle housing in the axial central cavity forming a spindle point forward of the spindle housing, extending rearward in the axial central cavity, and terminating in the first lock piece. The spindle is rotatably coupled to the spindle housing to allow stable, high speed rotation of the spindle relative to the housing as the workpiece is rotated by the lathe. A shank block with forward and rearward ends has a lock piece disposed at the forward end adapted in configuration to slidably interlock with the first lock piece of the spindle housing. The shank block has a shank at the rearward end for coupling to the lathe. The spindle housing is adjustable in precision increments relative to the shank block allowing the workpiece to be repositioned relative to the lathe.

BRIEF DESCRIPTION OF THE DRAWINGS

The novel features believed characteristic of the invention are set forth in the appended claims. The invention itself, however, as well as the preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
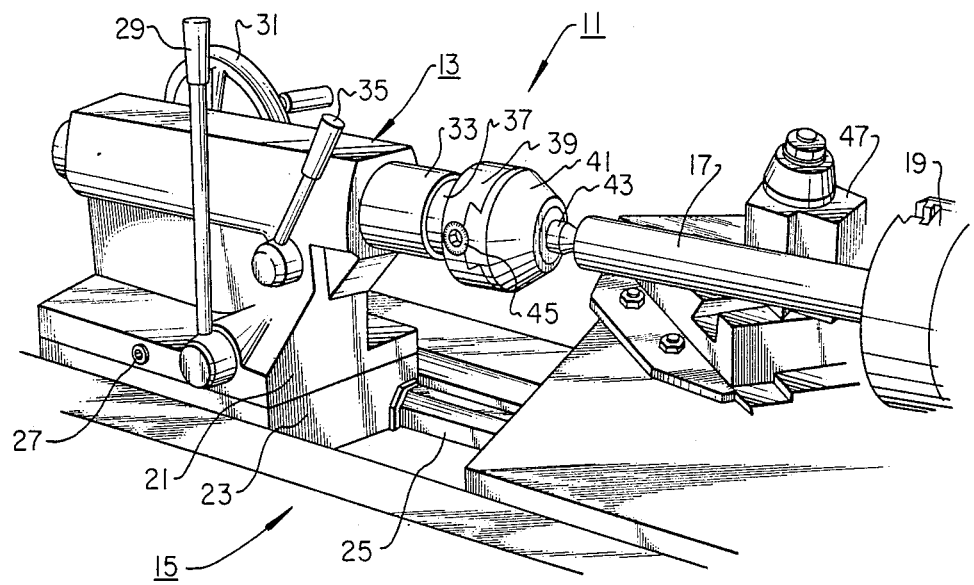
FIG. 1 is a perspective view of the adjustable precision live center of the present invention coupled between the tailstock of the lathe and a workpiece.

With reference now to the figures and in particular with reference to FIG. 1, there is depicted an adjustable precision live center 11 coupled between tailstock 13 of lathe 15 and workpiece 17. The opposite end of workpiece 17 is coupled to lathe 15 at chuck 19. The tailstock of lathe 15 comprises an upper block 21 mounted above lower block 23. Lower bock 23 is slidably carried by rail 25. Rail locking lever 29 serves to lock tailstock 13 in place on rail 25, while adjustment wheel 31 serves to adjust the position of tailstock 13 along rail 25.

Adjustment screw 27 in upper block 21 serves to adjust the side-to-side position of upper block 21 relative to lower block 23. Ordinarily, by this means the tailstock 13 of lathe 15 is aligned with chuck 19. Prior to making adjustments with adjustment screw 27, rail locking lever 29 must be released. Often, the unlocking of rail locking lever 29 is sufficient to slightly shift the position of tailstock 13 along rail 25—introducing an element of error into the adjustment process. Further, adjustment screw 27 is easily stripped at its threads, through repeated adjustments, diminishing the overall accuracy of adjustment screw 27, and preventing the operator from making precision adjustments.

As discussed above in the description of the background art, the removal of unwanted tapers from workpiece 17 requires a considerable expenditure of time when adjustment screw 27 is utilized. For example, assume that the end of workpiece 17 carried by tailstock 13 is positioned closer to tool post 47 than the end of workpiece 17 carried by, chuck 19. After one pass of tool post 47, workpiece 17 will have a taper, namely a gradual increase in diameter from the tailstock end to the chuck end. The operator can directly measure this increase in diameter to determine that an undesired taper is present in workpiece 17. To compensate for this unwanted taper, the operator must adjust the upper block 21 away from tool post 47, and make a second pass with tool post 47. Note that each manipulation of tailstock 13 introduces a margin of error into what should be precision work. Thus, the tailstock end of workpiece 17 may now be positioned farther away from tool post 47 than the chuck end of workpiece 17. If such over-compensation has occurred, during the second pass workpiece 17 is tapered with the tailstock end of workpiece 17 having a larger diameter than the chuck end of workpiece 17. This process is repeated until the operator converges upon a desired tolerance. This process is time consuming, often requiring in excess of one half hour to remove the taper from a single workpiece. Alternately, a taper may be desired, and the adjustment process is repeated with the converse objective of producing a specified taper rather than eliminating a taper from workpiece 17.

The live center 11 of the present invention allows one to make precision adjustments in the position of workpiece 17 independently of the position of tailstock 13. The live center 11 of the present invention consists of a shank 37 releasably coupled in quill 33 of tailstock 13 by quill locking lever 35. In the preferred embodiment, shank 37 is integrally formed with shank block 39 which is slidably and adjustably coupled with spindle housing 41 within which spindle 43 is rotatably carried in spindle housing 41. Point 59 of spindle 43 is disposed in a drilled hole in workpiece 17 (obscured in FIG. 1). The position of workpiece 17 relative to lathe 15 may be adjusted through operation of live center adjusting means 45 which serves to adjust the position of spindle housing 41 relative to shank block 39.

Figure 2:
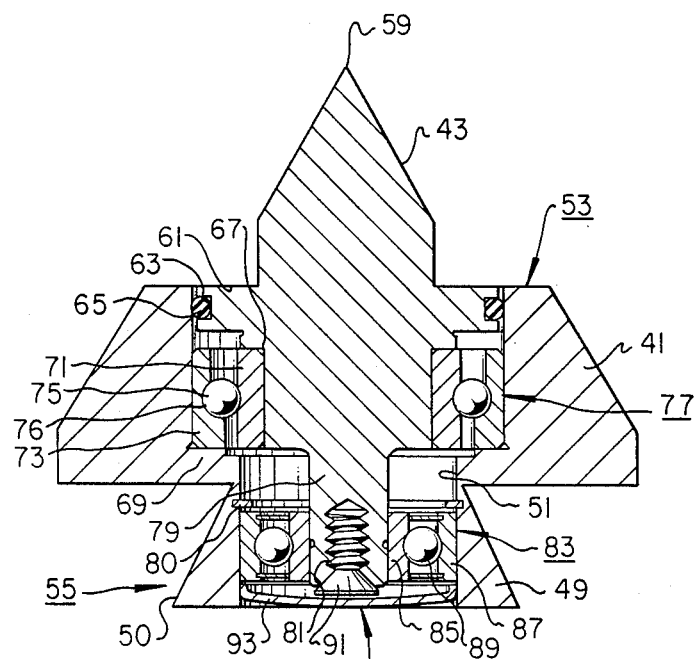
FIG. 2 is a cross-section view of the spindle and spindle housing of the present invention.

FIG. 2 is a cross-section view of spindle housing 41, and spindle 43. Spindle housing 41 has a forward end 53 and a rearward end 55 with a first lock piece 49 integrally formed with said spindle housing 41 at said rearward end 55. In one preferred embodiment, first lock piece 49 comprises a male dovetail way, or dovetail tenon 50 forming a substantially planar mating surface 57 at rearward end 55 and defining a traverse axis. Axial central cavity 51 is formed in spindle housing 41, extending from forward end 53 to rearward end 55 substantially through dovetail tenon 50, and substantially normal to the traverse axis defined by substantially planar mating surface 57.

Spindle 43 is concentrically disposed in axial central cavity 51 forming a spindle point 59 forward of spindle housing 41, extending rearward in axial central cavity 51 substantially through dovetail tenon 50, and terminating in dovetail tenon 50. Spindle 43 flares radially outward at spindle skirt 61. Spindle skirt 61 is adapted in configuration to substantially occlude axial central cavity 51 at forward end 53, and is substantially flush with forward end 53 when spindle 43 is disposed in axial central cavity 51. Annular radial groove 63 is provided in the outer periphery of spindle skirt 61 for receiving O-ring 65. O-ring 65 serves to seal axial central cavity 51 at the interface of spindle skirt 61 and spindle housing 41.

In one preferred embodiment, spindle 43 is rotatably carried within axial central cavity 51 at two locations. First, radial thrust bearing 77 rotatably carries spindle 43 just rearward of spindle skirt 61. Inner race 71 of radial thrust bearing 77 is concentrically disposed about spindle 43 abutting spindle 43 at spindle shoulder 67 for transferring axial thrust of spindle 43 to radial thrust bearing 77. Outer race 73 is interference fit with spindle housing 41 at housing shoulder 69. Bearings 75 are concentrically disposed between inner race 71 and outer race 73, translating axial thrust from spindle 43 to spindle housing 41 at bearing pocket 76 which is a slightly extended, pocket-shaped ball bearing groove, as is known in the art. In the preferred embodiment, radial thrust bearing 77 comprises a Fafnir Textron C312AABCE7 precision radial thrust bearing. Radial thrust bearing 77 serves to rotatably carry spindle 43 within spindle housing 41. Moreover, radial thrust bearing 77 serves to accommodate the slight compression inward of spindle 43 relative to spindle housing 41.

Second, radial bearing 83 is disposed in dovetail tenon 50 and serves to rotatably couple spindle 43 to spindle housing 41. In the preferred embodiment, spindle 41 is narrowed to form spindle stem 79 in dovetail tenon 50. Radial bearing 43 serves to concentrically carry spindle stem 79 in dovetail tenon 50. Radial bearing 83 comprises an inner race 85, an outer race 87, and bearings 89. Radial bearing 83 is held in place in dovetail tenon 50 by snap ring 90. Internally threaded bore 81 is provided in spindle stem 79 for accepting taper head screw 91, which secures spindle 43 within axial central cavity 51. Freeze plug 93 substantially occludes axial central cavity 51 at rearward end 55, preventing the entry of unwanted particles into axial central cavity 51.

Figure 3:
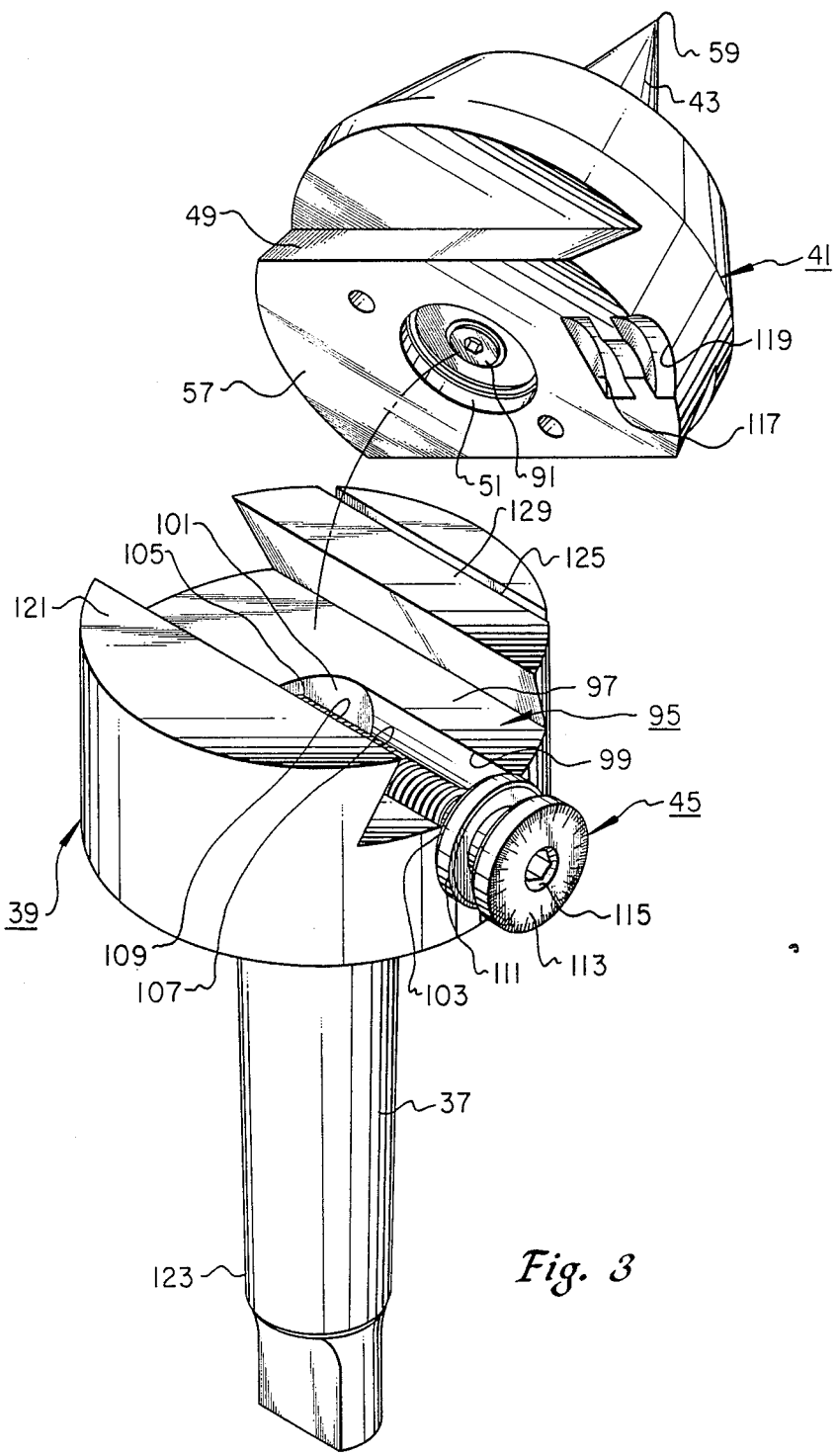
FIG. 3 is a partially exploded view of the adjustable precision live center of the present invention.

FIG. 3 is a partially exploded view of live center 11 illustrating the interrelationship of spindle housing 41 and shank block 39. Shank block 39 has forward end 121 and rearward end 123 with an integrally formed second lock piece 95 at said forward end 121, having a substantially planar mating surface 97 defining a traverse axis for mating with dovetail tenon 50. Shank 37 is disposed at said rearward end 123 of shank block 39.

Semicircular trough 99 is disposed in shank block 39, providing an opening in substantially planar mating surface 97, and having a first end 101 and a second end 103. Internally threaded bore 105 in shank block 39 is disposed at first end 101 of semicircular trough 99. Second end 103 of semicircular trough 99 opens at the outer periphery of shank block 39. Semicircular trough 99 is adapted to receive bolt 107 which has externally threaded rod 109 adapted to mate with internally threaded bore 105 at first end 101, and a pair of circular flanges 111, 113 at second end 103. Circular drive flange 111 is provided inward along bolt 107 from circular graduated flange 113. The outer surface of circular graduated flange 113 is provided with hexagonal adjustment port 115 adapted to receive a hexagonal allen wrench and a plurality of precision graduations.

A pair of circular grooves 117, 119 are provided in substantially planar mating surface 57 of dovetail tenon 50. Inner semicircular groove 117 is adapted to receive a portion of circular drive flange 111, while outer semicircular groove 119 is adapted to receive circular graduated flange 113 when substantially planar mating surface 57 interfaces with substantially planar mating surface 97. Slot 125 is cut in shank block 39 parallel to dovetail mortise 96 for defining mortise wing 129. Set screw 127 (obscured in FIG. 3) is provided to urge mortise wing 129 inward to lock the position of spindle housing 41 relative to shank block 39.

In operation, spindle housing 41 is adjustable relative to shank block 39 by operation of bolt 107. More specifically, flanges 111, 113 serve to bear upon semicircular grooves 117, 119 of spindle housing 41, moving said spindle housing 41 relative to shank block 39 as threaded rod 109 of bolt 107 is advanced or retracted in internally threaded bore 105 from torque applied to adjustment port 115.

Circular graduated flange 113 is calibrated to relate rotational movement of circular flanges 111, 113 to the traverse position of threaded rod 109, and thus to the traverse position of spindle housing 41 relative to shank block 39. Through precision threading of threaded rod 109, and precision calibration of circular graduated flange 113, the lateral position of spindle point 59 may be adjusted in increments of one-thousands of an inch or less.

As workpiece 17 is rotated by lathe 15 spindle 43 rotates relative to spindle housing 41 through operation of radial thrust bearing 77 and radial bearing 83. Through this configuration, spindle 43 may be rotated at very high rotational speeds while retaining stability. Such stability is attributable in part to the overall length of spindle 43; more specifically, since spindle stem 79 extends into dovetail tenon 50, rotational stability is enhanced. Moreover, radial bearing 83 which rotatably couples spindle stem 79 in dovetail tenon 50 serves to enhance rotational stability.

The overall compactness of live center 11 serves to maximize the lathe tool's stability. More specifically, longer lathe tools are less reliable due to a loss in rigidity directly attributable to tool length. The present invention minimizes the live center length, increasing such rigidity, and allowing for precision work.

Thus, the present invention serves two distinct functions: enhancing rotational stability of spindle 43, while preserving the overall rigidity of live center 11. The objective of enhanced rotational stability can be achieved by both providing as long a spindle 43 as possible, and by providing for adequate rotational coupling to spindle housing 41. The objective of maximum rigidity can be accomplished by maintaining the tool as compact as possible. Thus, the objectives are to some extent conflicting, since an elongated spindle 43 generally requires a longer live center 11, enhancing rotational stability while diminishing overall rigidity. The present invention maximizes both objectives by providing a spindle 43 that is as long as possible, while maintaining overall compactness of live center 11. This objective is achieved inpart through use of first and second lock pieces 49, 95 with spindle 43 extending substantially through first lock piece 49, and rotatably coupled therein.

As discussed above, the present invention presents a variety of advantages over existing prior art systems. Rotational stability, and tool rigidity are maximized in the present invention. Additionally, the position of workpiece 17 may be adjusted relative to lathe 15 without requiring any adjustment of tailstock 13. As discussed, sources of error inherent in the adjustment process of tailstock 13 are eliminated. Further, the time required to remove tapers from workpieces is minimized to a fraction of the time required under existing technology. Live center 11 also serves to eliminated or reduce the wear and tear on lathe 15, resulting in fewer lathe overhauls and resulting loss of productive lathe time.

Workpiece 17 may be positioned relative to lathe 15 in precision increments through the operation of live center adjustment means 45. The present invention has an additional advantage over prior art systems in that the live center adjustment means 45 is protected from damage since it is entirely enclosed within live center 11. Thus, threaded rod 109, flanges 111, 113, semicircular grooves 117, 119, and internally threaded bore 105 are fully protected from impact or contamination by metal shavings or other foreign particles. Further, semicircular trough 99 may be lubricated with grease or oils to diminish thread wear.

Additional advantages include an axial central cavity 51 sealed at forward end by spindle skirt 61 and rearward end by freeze plug 93. Thus, axial central cavity 51 may be filled with grease or light oil to enhance the operation of live center 11.

While the invention has been particularly shown and described with reference to a preferred embodiment, it will be understood by those skilled in the art that various changes in form and detail may be made therein without departing from the spirit and scope of the invention. For example, the live center of the present invention could be configured to adjust a workpiece upward and downward relative to the lathe instead of side-to-side.

I claim:

1. A live center for coupling a work piece to a lathe, comprising:

a spindle housing with forward and rearward ends at opposite ends of a central axis, said rearward end having a rearward surface with a male first lock piece disposed at said rearward end and protruding from said rearward surface and traverse to said central axis, said spindle housing having an axial central cavity formed therethrough extending from said forward end to said rearward end terminating in said first lock piece;

a spindle for coupling to said workpiece, carried by said spindle housing in said axial central cavity forming a spindle point forward of said spindle housing, extending rearward in said axial central cavity, and terminating in said first lock piece;

means for rotatably coupling said spindle to said spindle housing and for allowing stable high speed rotation of said spindle relative to said spindle housing as said workpiece is rotated by said lathe, including a bearing assembly disposed in said first lock piece of said spindle housing, aligned with said axial central cavity of said spindle housing for rotatably coupling said spindle to said first lock piece to enhance rotational stability;

a shank block with forward and rearward ends having a female second lock piece disposed at said forward end and adapted in configuration to slidably interlock with said first lock piece in a positive interlocking relation, and having a shank for coupling to said lathe at said rearward end; and means for adjusting the position of said spindle housing relative to said shank block to reposition said workpiece relative to said lathe, by moving said first lock piece traversely to said central axis within said second lock piece only along a straight line defined by said second lock piece.

2. A live center according to claim 1 wherein said first lock piece extends outward from said spindle housing and said second lock piece is adapted in configuration to receive said first lock piece.

3. A live center according to claim 1 wherein said first lock piece and said second lock piece slidably interlock for allowing traverse adjustment in position of said spindle housing relative to said shank block.

4. A live center according to claim 1 wherein said means for rotatably coupling comprises at least in part a bearing assembly disposed in said first lock piece and adapted to receive said spindle.

5. A live center according to claim 1 wherein said first lock piece is integrally formed with said spindle housing.

6. A live center according to claim 1 wherein said second lock piece is integrally formed with said shank block.

7. A live center for coupling a workpiece to a lathe, comprising:

a spindle housing with forward and rearward ends at opposite ends of a central axis, having a male dovetail way disposed traverse to said central axis at said rearward end, said spindle housing having an axial central cavity formed therethrough extending from said forward end to said rearward end substantially through said male dovetail way;

a spindle for coupling to said workpiece carried by said spindle housing in said axial central cavity forming a spindle point forward of said spindle housing, extending rearward in said axial central cavity substantially through said male dovetail way;

means for rotatably coupling said spindle to said spindle housing and for allowing stable high speed rotation of said spindle relative to said spindle housing, including a bearing assembly disposed in said male dovetail way of said spindle housing, aligned with said axial central cavity of said spindle housing for rotatably coupling said spindle to said male dovetail way to increase stability of said spindle;

a shank block with forward and rearward ends, having a female dovetail way disposed at said forward end for mating with said male dovetail way of said spindle housing in a position traverse to said central axis of said spindle housing and having a shank for coupling to said lathe at said rearward end; and means for precisely adjusting the position of said spindle housing relative to said shank block to alter the position of the workpiece relative to said lathe, by moving said male dovetail way traversely to said central axis within said female dovetail way along a line defined by the position of said female dovetail way relative to said lathe.

8. A live center according to claim 7 wherein male dovetail way is integrally formed with said spindle housing.

9. A live center according to claim 7 wherein said female dovetail way is integrally formed with said shank block.

10. A live center according to claim 7 wherein said means for rotatably coupling comprises at least in part a bearing assembly concentrically disposed in said axial central cavity in said male dovetail way for rotatably carrying said spindle.

11. A live center for coupling a workpiece to a lathe comprising:

a spindle housing with forward and rearward ends, having an axial central cavity formed therethrough extending from said forward end to said rearward end and having a male dovetail way disposed at said rearward end, wherein said male dovetail way is disposed traverse to said axial central cavity and wherein said axial central cavity extends substantially through said male dovetail way;

a spindle for coupling to said workpiece, carried by said spindle housing in said axial central cavity, forming a spindle point forward of said spindle housing, and extending rearward in said axial central cavity substantially through said male dovetail way;

a first bearing assembly concentrically disposed in said spindle housing for rotatably carrying said spindle;

a second bearing assembly concentrically disposed in said spindle housing rearward of said first bearing assembly in said male dovetail way for rotatably carrying said spindle;

a shank block with forward and rearward ends, having a female dovetail way disposed at said forward end for mating with said male dovetail way of said spindle housing, and having a shank for coupling to said lathe at said rearward end, wherein said female dovetail way is disposed traverse to said axial central cavity of said spindle housing when coupled to said male dovetail way; and means for precisely adjusting the position of said spindle housing traverse to said shank block to alter the position of the workpiece relative to said lathe, by moving said male dovetail way within said female dovetail way.

12. A live center for coupling a workpiece to a tailstock of a lathe, comprising:

a spindle housing with forward and rearward ends having integrally formed dovetail tenon with a substantially planar mating surface defining a traverse axis disposed at said rearward end, and having an axial central cavity formed therethrough substantially normal to said traverse axis and extending from said forward end to said rearward end substantially through said dovetail tenon, said dovetail tenon having at least one semicircular groove disposed on said substantially planar mating surface substantially normal to said traverse axis;

a spindle for coupling to said workpiece carried by said spindle housing in said axial central cavity forming a spindle point forward of said spindle housing, extending rearward in said axial central cavity substantially through said dovetail tenon, and terminating in said dovetail tenon;

means for rotatably coupling said spindle to said housing and for allowing stable high speed rotation of said spindle relative to said spindle housing;

a shank block with forward and rearward ends having a shank for coupling to said tailstock of said lathe at said rearward end and having an integrally formed dovetail mortise disposed at said forward end having a substantially planar mating surface defining a traverse axis for mating with said dovetail tenon at said traverse axis, said dovetail mortise having a semi-circular trough disposed in said substantially planar surface and aligned with said traverse axis, said semi-circular trough having first and second ends with an outer opening at said first end and an internally threaded bore in said shank block aligned to said traverse axis at said second end;

a bolt with first and second ends having a threaded rod at said second end for coupling with said internally threaded bore of said shank block and having at least one circular flange disposed at said first end of said bolt each disposed in part in one of said at least one semi-circular grooves in said substantially planar surface of said dovetail tenon; and wherein advancement or retraction of said threaded rod of said bolt causes said at least one circular flange to bear upon said at least one semi-circular groove of said spindle housing moving said spindle housing relative to said shank block.

13. A live center according to claim 12 wherein at least one of said at least one circular flange is graduated for allowing precisely controlled movement of said spindle housing relative to said shank block.

14. A live center according to claim 12 wherein said threaded rod of said bolt and said internally threaded bore of said shank block are precision threaded, and wherein the outermost circular flange is graduated to correlate radial motion of said bolt with the traverse movement of said spindle housing relative to said shank block.

* * * * *